(12) United States Patent
Kang et al.

(10) Patent No.: US 11,465,085 B2
(45) Date of Patent: Oct. 11, 2022

(54) AIR PURIFYING SYSTEM

(71) Applicants: LG ELECTRONICS INC., Seoul (KR); CHUNGANG UNIVERSITY INDUSTRY ACADEMIC COOPERATION FOUNDATION, Seoul (KR)

(72) Inventors: Jiyoung Kang, Seoul (KR); Haeyoong Chung, Seoul (KR); Jongkeon Jeon, Seoul (KR); David Kangseong Lee, Seoul (KR); Daeyoung Kwak, Seoul (KR); Sohee Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 346 days.

(21) Appl. No.: 16/821,737

(22) Filed: Mar. 17, 2020

(65) Prior Publication Data
US 2020/0298157 A1 Sep. 24, 2020

(30) Foreign Application Priority Data
Mar. 19, 2019 (KR) .................. 10-2019-0031445

(51) Int. Cl.
*B01D 46/00* (2022.01)
*F24F 1/035* (2019.01)
(Continued)

(52) U.S. Cl.
CPC .......... *B01D 46/0004* (2013.01); *B01D 46/24* (2013.01); *B01D 46/4227* (2013.01);
(Continued)

(58) Field of Classification Search
CPC .................... B01D 46/62; B01D 46/2403; B01D 46/0002; B01D 46/0004; B01D 46/0005;
(Continued)

(56) References Cited

U.S. PATENT DOCUMENTS 6,466,737 B1  10/2002  Birdsell et al.
2003/0024218 A1  2/2003  Stephens et al.
(Continued)

FOREIGN PATENT DOCUMENTS

AU  2017255209  12/2018
CN  1651827  8/2005
(Continued)

OTHER PUBLICATIONS

European Search Report dated Aug. 12, 2020 issued in Application No. 20163818.6.
(Continued)

*Primary Examiner* — Robert Clemente
(74) *Attorney, Agent, or Firm* — KED & Associates LLP

(57) ABSTRACT

An air purifying system may include a main air purifier that has a flat upper surface configured to support at least two cylindrical portable air purifiers. Each of the main and portable air purifiers may have a fan to suction air and a filter to filter suctioned air. The upper surface of the main air purifier may include a seating groove, an elastic member provided in the seating groove, and a seating plate resting on top of the elastic member. When a portable air purifier is seated on the seating groove, the elastic member may be compressed and the seating plate may be lowered such that the portable air purifier may be supported within an inner wall of the seating groove. When the portable air purifier is removed from the seating groove, the elastic member may expand and raise the seating plate back to an initial position.

16 Claims, 17 Drawing Sheets

(51) Int. Cl.
*B01D 46/24* (2006.01)
*B01D 46/42* (2006.01)
*B01D 46/58* (2022.01)

(52) U.S. Cl.
CPC ..... *B01D 46/4245* (2013.01); *B01D 46/4254* (2013.01); *B01D 46/58* (2022.01); *F24F 1/035* (2019.02); *B01D 2267/30* (2013.01); *B01D 2279/50* (2013.01); *F24F 2221/12* (2013.01)

(58) Field of Classification Search
CPC ............... B01D 46/0043; B01D 46/0049; B01D 46/64; B01D 46/442; B01D 46/58; B01D 46/60; B01D 2279/50; B01D 2267/60; B01D 46/4245; B01D 46/4254; B01D 2267/30; F24F 8/10; F24F 8/108; F24F 1/0071; F24F 1/0073; F24F 2221/12
See application file for complete search history.

(56) References Cited

U.S. PATENT DOCUMENTS

| | | |
|---|---|---|
| 2005/0172816 A1 | 8/2005 | Son et al. |
| 2014/0020561 A1 | 1/2014 | Aery et al. |
| 2018/0299899 A1 | 10/2018 | Suvama |
| 2019/0021568 A1 | 1/2019 | Kim |
| 2019/0056126 A1 | 2/2019 | Law et al. |
| 2019/0276241 A1 | 9/2019 | Royce |
| 2020/0030736 A1 | 1/2020 | Yun |
| 2022/0122397 A1 | 4/2022 | Cristache |

FOREIGN PATENT DOCUMENTS

| | | |
|---|---|---|
| CN | 1752617 | 3/2006 |
| CN | 1291684 | 12/2006 |
| CN | 201251250 | 6/2009 |
| CN | 204858756 | 12/2015 |
| CN | 105333528 | 2/2016 |
| CN | 105757817 | 7/2016 |
| CN | 107042040 | 8/2017 |
| CN | 107270391 | 10/2017 |
| CN | 107401803 | 11/2017 |
| CN | 206669923 | 11/2017 |
| CN | 107575944 | 1/2018 |
| CN | 107728484 | 2/2018 |
| CN | 108180616 | 6/2018 |
| CN | 108895538 | 11/2018 |
| CN | 208579441 | 3/2019 |
| EP | 3127462 | 2/2017 |
| EP | 3211343 | 8/2017 |
| JP | H04-103925 | 4/1992 |
| KR | 10-2008-0051976 | 6/2008 |
| KR | 10-2009-0114028 | 11/2009 |
| KR | 10-1698045 | 1/2017 |
| KR | 10-2017-0044553 | 4/2017 |
| WO | WO 2004/108248 | 12/2004 |

OTHER PUBLICATIONS

Chinese Office Action issued in Application No. 2021052802933920 dated Jun. 2, 2021.
Chinese Office Action issued in Application No. 202010182206.6 dated Mar. 31, 2021.
European Search Report dated Aug. 14, 2020 issued in Application No. 20164334.3.
Chinese Office Action dated Jun. 3, 2021 issued in Application No. 202010190947.9.
European Search Report dated Aug. 20, 2020 issued in Application No. 20164348.3.
U.S. Office Action issued in U.S. Appl. No. 16/821,871 dated Apr. 26, 2022.
U.S. Appl. No. 16/821,737, filed Mar. 17, 2020.
U.S. Appl. No. 16/821,806, filed Mar. 17, 2020.
U.S. Appl. No. 16/821,871, filed Mar. 17, 2020.

AIR PURIFYING SYSTEM

CROSS-REFERENCE TO RELATED APPLICATION(S)

The present application claims priority under 35 U.S.C. § 119 to Korean Patent Application No. 10-2019-0031445, filed on Mar. 19, 2019, whose entire disclosure is hereby incorporated by reference.

BACKGROUND

1. Field

The present disclosure relates to an air purifier.

2. Background

An air cleaner or purifier may be an apparatus that suctions contaminated air, filters or purifies the contaminated air, then discharges the purified air. For example, an air purifier may include an air blowing device or fan to introduce outside air into an interior of the air cleaner and a filter to filter dust, germs, and other foreign matter (hereinafter "foreign matter") from the air. Generally, an air purifier may be configured to purify an interior space or room such as a home or office.

An air purifier may be manufactured in a predetermined size and shape according to a predetermined design and supplied to the market. A consumer may purchase an air purifier that approximately matches a size and air cleaning capacity desired. However, due to a lack of customization, it may be difficult for a consumer to purchase an air cleaner that is suited to his or her particular residential environment, which may include a plurality of indoor rooms having various shapes, sizes, and air quality. It may be especially difficult for customers to gauge which air purifier to purchase for an atypical room having an unusual shape or design.

WO 2004/00108248 A2 discloses a modular air purification system capable of modularizing or customizing a filter member in response to an installation environment of an air purifier, but this modularizing must be done only by an expert, and cannot be performed by a general user.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
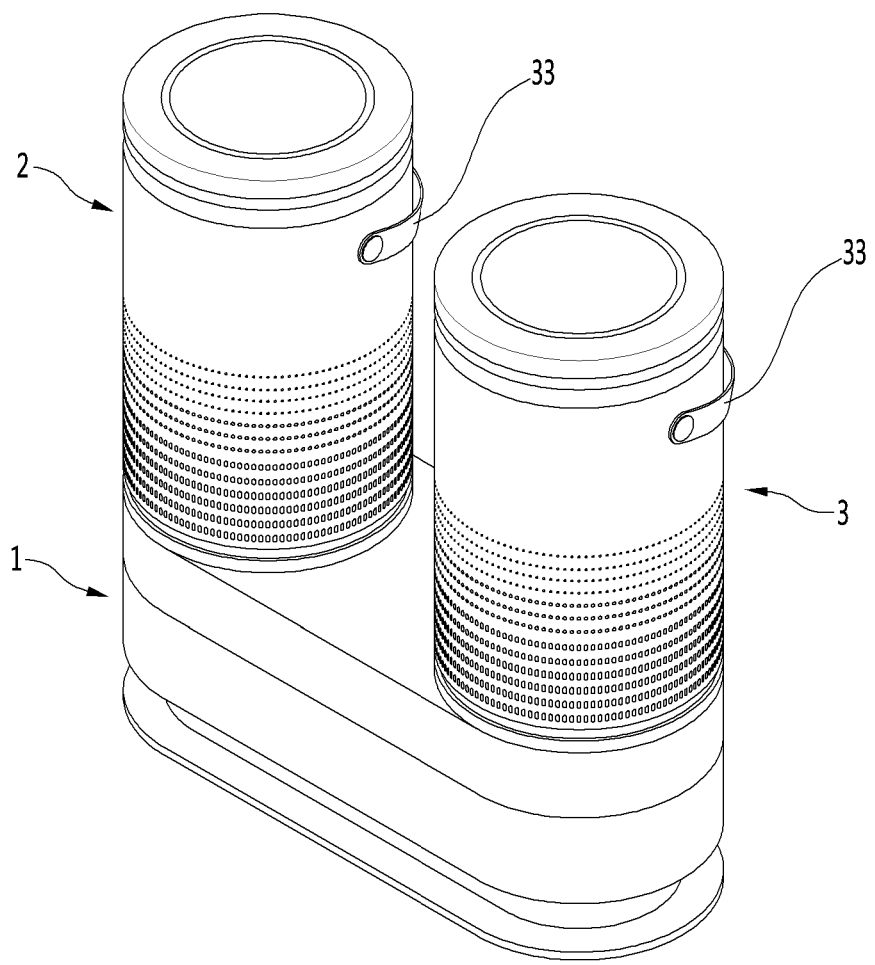
FIG. 1 is a perspective view of an air purifying system according to an embodiment.

Referring to FIG. 1, an air cleaning or purifying system may include at least two portable or mobile air purifiers or cleaners 2 and 3 and a base or cradle 1 on which the two portable air purifiers 2 and 3 may be seated on and lifted and removed from. The portable air purifiers 2 and 3 may be independently operated or controlled. The base 1 may also be referred to as a docking station. The base 1 may not only seat the at least two air purifiers 2 and 3 but may also optionally function as an additional air purifier. Although embodiments disclosed herein are not limited to a base 1 functioning as an air purifier 1 and the base 1 may simply serve as a docking station, for convenience of description, an embodiment where the base 1 is also an air purifier will be described herein. The base 1 will hereinafter be referred to as a base or main air purifier 1.

The base air purifier 1 may be a fixed or stationary air purifier 1 configured to remain in a certain position or space, while the portable air purifiers 2 and 3 may be picked up and moved to separate locations. However, the base air purifier 1 may also be moved and adjusted. The portable air purifiers 2 and 3 may have a smaller size and weigh less than the base air purifier 1 and include handles 33, so the portable air purifiers 2 and 3 may be easier to carry and move than the base air purifier 1. Alternatively, the base air purifier 1 may be installed or fixed to a floor or wall so as to be more stationary.

The portable air purifiers 2 and 3 may be supplied with energy and/or charged when seated in the base air purifier 1. The handle 33 may be provided on an upper portion of the portable air purifier 2, 3 for convenient movement of the portable air purifier 2, 3.

The base air purifier 1 may be placed in a large and/or dirty room (e.g., a living room or family room), as the base air purifier 1 may have a higher air cleaning or purifying capacity than the portable air purifiers 2 and 3. The living room and/or family room may be a space in which the user spends a lot of time and may be the widest among the various indoor rooms in a house or apartment, and therefore may require the strongest air purifying action due to a large number of people and/or frequency of occupancy of the room.

The portable air purifier 1 may be used in a smaller, cleaner, and/or specialized space such as a kitchen, study, office, closet, bedroom, bathroom, etc. The kitchen or study, for example, may be a more closed space than other rooms.

When an intensive and efficient air purifying operation is required, the portable air purifiers 2 and 3 may be seated on the base air purifier 1, and the base and portable air purifiers 1, 2, and 3 may all work in the same room. In this case, a quick and efficient air purifying operation may be performed.

An air purifying or cleaning capacity per unit time of the base air purifier 1 as compared with air purifying or cleaning capacities of the portable air purifiers 2 and 3 may have a ratio similar to 4:3:3. The air purifying capacity of the entire air purifying system may be 100% of a total air cleaning or purifying capacity, with the base air purifier 1 responsible for 40% of the total air purifying capacity and each portable air purifier 2, 3 responsible for 30%.

The air purifying capacity may not depend on a three-dimensional size of the indoor space. The air purifying capacity may be predetermined in consideration of a three-dimensional size of an indoor space where the air purifier 1, 2, or 3 is likely to be provided or based on predetermined or anticipated operating modes of the base air purifier 1 and the portable air purifiers 2 and 3.

The base air purifier 1 may be provided in a laterally long shape that extends in a horizontal direction. A first portable air purifier 2 may be seated on a first (e.g., left) side of the base air purifier 1 and a second portable air purifier 3 may be seated on a second (e.g., right) side of the base air purifier 1.

A handle 33 may be provided on an upper portion of each portable air purifier 2, 3, and a user may move or carry the portable air purifier 2, 3, by holding the handle 33. The handle 33 may be hinged to an upper side surface of the portable air purifier 2,3 by a hinge structure, and may be rotatable over a top of the air purifier 2, 3. A position of the handle 33 may be configured so as not to interfere with side discharge or suction holes formed in a lower side surface of the portable air purifier 2, 3.

Figure 2:
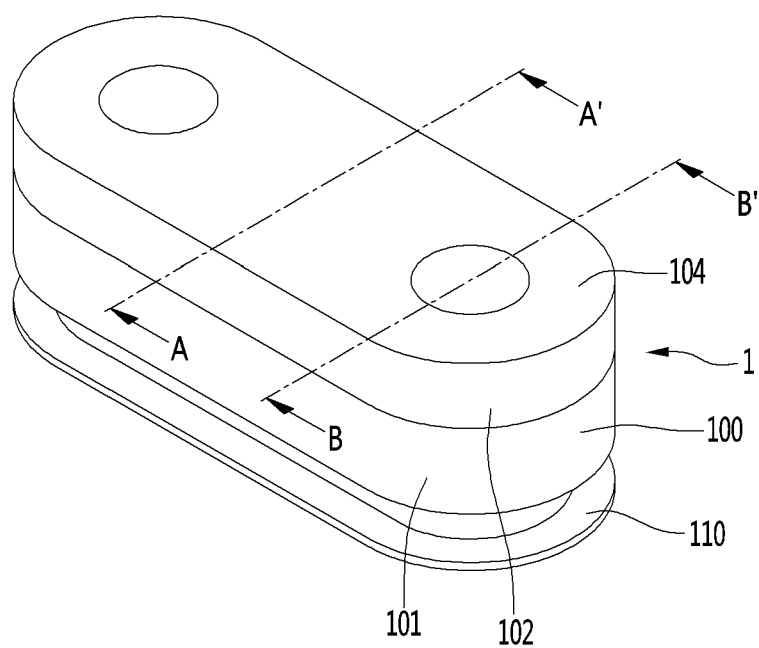
FIG. 2 is a perspective view of a base air purifier or docking station.

Referring to FIG. 2, the base air purifier 1 may have an outer wall 100 that extends horizontally and forms an exterior of the base air purifier 1. The outer wall 100 may have a predetermined height and have an elliptical shaped or stadium shaped horizontal cross-section. An inlet or suction port 110 may be formed at a lower portion of the outer wall 100. An upper seating surface 104 may form an upper or top surface of the base air purifier 1, and may be configured to receive the portable air purifiers 2 and 3. At least a portion of the upper seating surface 104 may be flat. For example, an area outside where the portable air purifiers 2 and 3 may be flat. A surface over which the portable air purifiers 2 and 3 are seated may also be flat.

The outer wall 100 may be provided longer in a length or horizontal (i.e., left and right) direction than in a width (i.e., front and rear) direction. The suction port 110 may have at least one opening to an inner space formed inside the outer wall 100. At least one fan 106 (FIG. 6) may be provided inside the inner space to suction air through the suction port 110. A plurality of fans may be provided in the inner space. As an example, a first fan may be provided on a left side of the inner space and a right fan may be provided on a right side of the inner space. However, embodiments disclosed herein are not limited to two fans. For example, a third fan may be provided in a center of the inner space.

The outer wall 100 may be divided into a closed or non-porous wall or region 101 and a discharge wall or region 102, which may have a plurality of holes or openings. The closed wall 101 may be a region or area through which air may not flow directly, and the discharge wall 102 may be a region or area where air from the inner space may be discharged to an outside of the base air purifier 1. The closed wall 101 may be provided between the discharge wall 102 and the suction port 110, and may provide a sufficient distance between the discharge wall 102 and the suction port 110 to prevent or reduce air discharged out of the discharge wall 102 from flowing back to the suction port 110, especially since clean air discharged through the discharge wall 102 may have a low flow velocity.

The base air purifier 1 may be placed in a large room (e.g., living room or family room) and may be operated in a windless or quiet mode, which may be implemented in a 24 hour or non-stop state. In the windless mode, the base air purifier 1 may be operated at a low suction or fan rate having low noise, so a user in the living room, for example, may not be annoyed by or notice an operation of the base air purifier 1. Details of the windless mode will be described later.

Figure 3:
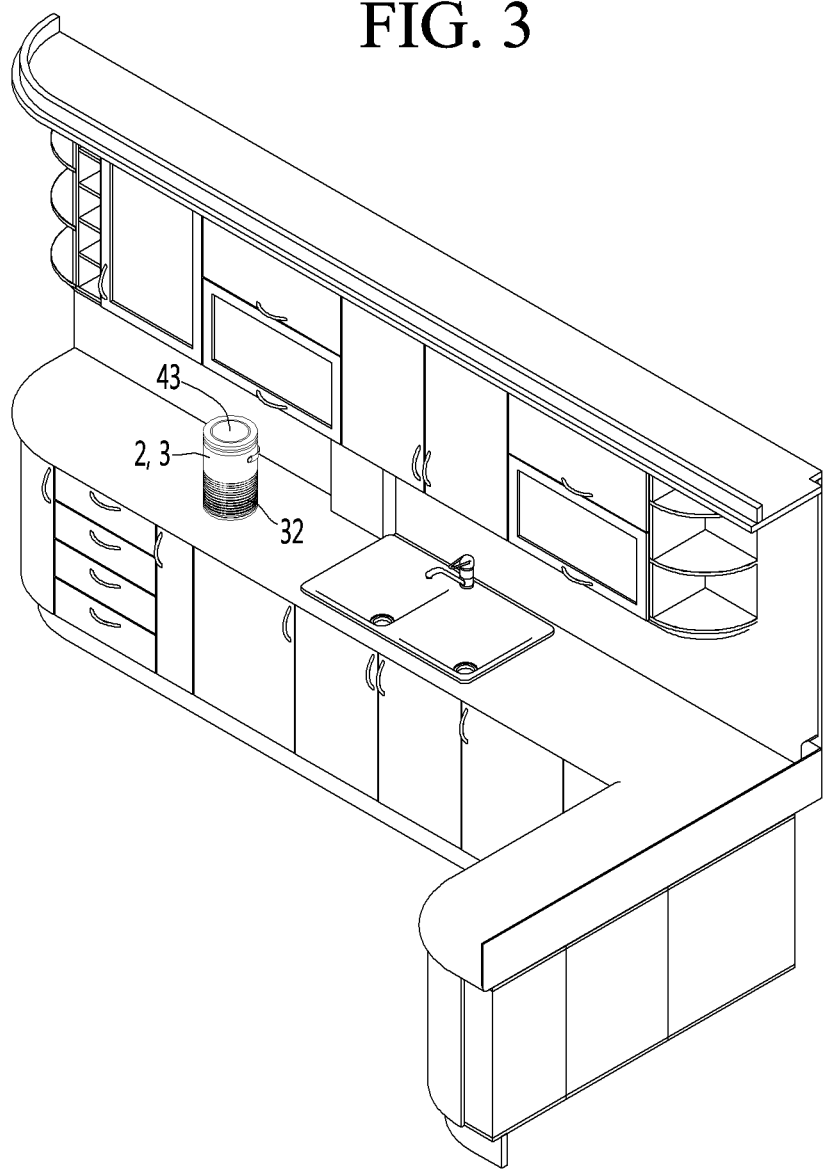
FIG. 3 shows a portable or mobile air purifier being used in a kitchen.
Figure 4:
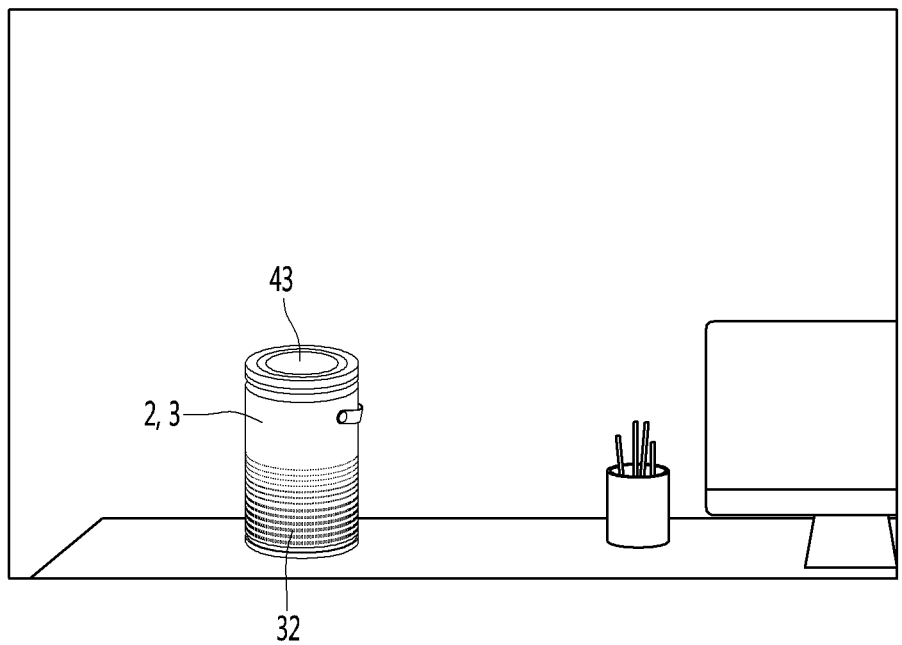
FIG. 4 shows a portable or mobile air purifier being used in a study or an office.

Referring to FIGS. 3 and 4, the portable air purifiers 2 and 3 may be provided with a suction or inlet portion or wall 32 and an air guide 43 to adjust a discharge direction of clean air. The air guide 43 may include at least one vane that inclines and/or rotates to change a direction of air. The suction portion 32 may include a plurality of holes 34 (FIG. 5) formed in a side surface of the air purifier, and air may be suctioned through the suction portion 32. The air guide 43 may have at least one opening or hole and serve as an outlet or discharge portion. The air guide 43 may be configured to quickly change a direction of a large amount of air to guide the discharged air toward a desired direction.

The portable air purifiers 2 and 3 may quickly perform an air purifying function at a desired place. For example, as shown in FIG. 3, smoke generated in the kitchen during cooking may be suctioned into the suction portion 32 and filtered by a fan 41 (FIG. 5) inside the portable air purifier 2 or 3. Clean, filtered air filtered may be blown and dispersed into the kitchen by the air guide 43. The user may choose to configure the air guide 43 to direct air toward the stove or cooker where smoke is being generated. As another example, as shown in FIG. 4, a portable air purifier 2 or 3 may be placed in a highly polluted or dusty environment such as a study, and clean air may be quickly blown toward a user working in the study.

The user may conveniently grasp the handle 33 of the portable air purifier 2 or 3 and to transport the portable air purifier 2 or 3 to another room. The user may carry the portable air purifier 2 or 3 to or from the base air purifier 1 to seat the portable air purifier 2 or 3 on the base air purifier 1 or to remove the portable air purifier 2 or 3 from the base air purifier 1 for placement in another room at a desired position. The portable air purifiers 2 and 3 may be charged on the base air purifier 1 while seated. Alternatively or in addition thereto, the portable air purifiers 2 and 3 may be provided with a socket and terminal and/or separate plug to receive power from an external commercial power source (e.g., wall socket).

Figure 5:
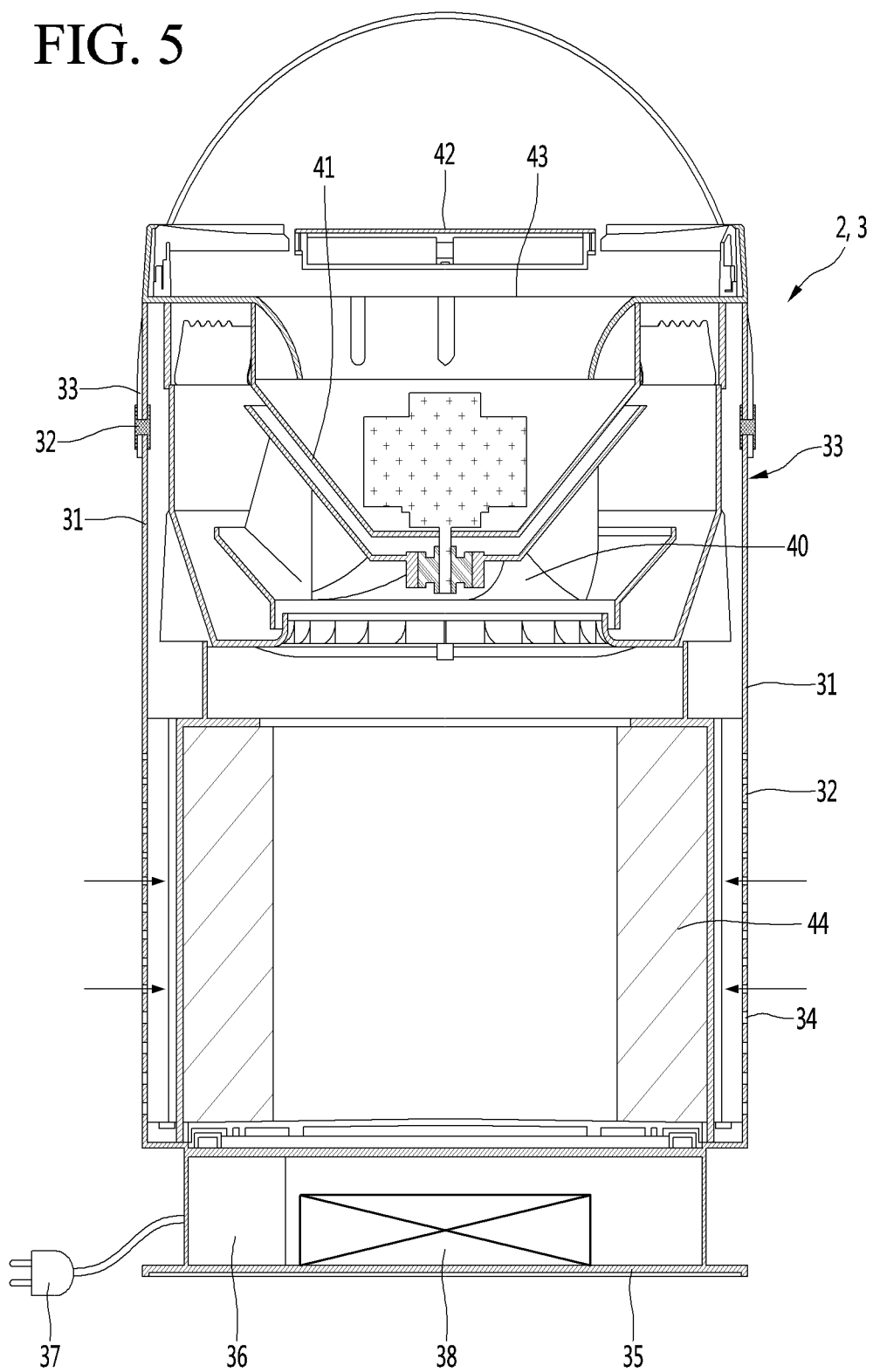
FIG. 5 is a schematic cross-sectional view of a portable air purifier.

Referring to FIG. 5, the portable air purifier 2, 3 may have a general cylindrical shape formed by an outer wall 31. A base 35 may be provided below the outer wall 31 to form a lower end of the portable air purifier 2, 3, which may be placed on a floor, the base air purifier 1, or another surface (e.g., desk).

The portable air purifier 2, 3 may suction ambient or external air from a bottom or lower portion, filter foreign matter from the suctioned air, and discharge air from out of a top or upper portion. The suction portion 32 may have a plurality of suction holes 34 formed in a lower portion of the outer wall 31, and air may be suctioned through the plurality of holes. A closing portion or wall 39 may be formed above the suction portion 32. The closing portion 39 may be a non-porous region through which air may not directly flow.

The suction holes 34 may have a diameter of several tens of millimeters to several millimeters. Outside air may be suctioned together with foreign matter through the suction holes 34. The suctioned air and foreign matter may flow upward toward a filter assembly 44. The filter assembly 44 may include a filter to filter foreign matter from the suctioned air and a filter housing to support the filter.

A fan 41 may suction the ambient air through the suction portion 32. The fan 41 may be provided in a fan housing 40, which may be supported on the filter housing of the filter assembly 44. The air guide 43 may be arranged an inner space of the outer wall 31. Clean air discharged from the filter assembly 44 may be guided by the air guide 43.

Power may be supplied to the portable air purifier 2, 3 by a power source or a wireless charging method (e.g., a wireless power transfer or WPT method such as an electromagnetic induction method). A display 42 (e.g., a light emitting diode or liquid crystal display) may be provided on an upper surface of the portable air purifier 2, 3 to display an operating state, charging information, time information, air quality information, or other information of the portable air purifier 2, 3. Alternatively or in addition hereto, the display 42 may include a light emitting device (e.g., light emitting diode LED) and may serve as a lamp or light device to illuminate a room in which the portable air purifier 2, 3 is placed.

A wireless charging module 38 (e.g., wireless power transceiver or receiver) may be provided inside of the base 35. The wireless charging module 38 may be at or close to a bottom surface of the base 35 so as to align with and/or interact with a wireless charging module 121 of the base air purifier 1 (FIG. 7), which may be provided at an upper surface of the base air purifier 1. The portable air purifier 2, 3, may include a battery, which may store power received from the wireless charging module 38.

An interior of the base 35 may also include an accommodation or wire space 36 in which electric wires (e.g., for a plug 37) are provided and stored. The plug 37 may be plugged into a commercial external power source (e.g., wall socket) to supply power to the portable air purifier 2, 3, and/or charge a battery. Alternatively or in addition hereto, the plug 37 may be configured to insert into a universal serial bus (USB) port or other ports for power supply (e.g., mini USB, micro USB, HDMI, etc.)

The handle 33 may be provided at an upper end of the outer wall 31 so that the user may easily carry the portable air purifier 2 or 3. The handle 33 may be fixed to the outer wall 31 to be rotatable by a hinge 33a. The handle 33 may be rotated and lifted to extend over a top of the display 42 when the user uses the handle 33 and may be lowered to a side when not in use. The handle 33 may not interfere with an air flow (i.e., a suction of air through the suction portion 32 and/or a discharge of air via the air guide 43) of the portable air purifier 2, 3.

A direction of air discharged by the fan 41 may be adjusted based on a control of the air guide 43. For example, clean air may be provided at a predetermined speed directly to a user who desires clean air. The portable air purifier 2 and 3 may be referred to as a direct air blow type air purifier. The base air purifier 1 may be operated in a windless mode as described above, and may indirectly provide clean air to the user. The base air purifier 1 may be referred to as an indirect blow type air purifier.

Figure 6:
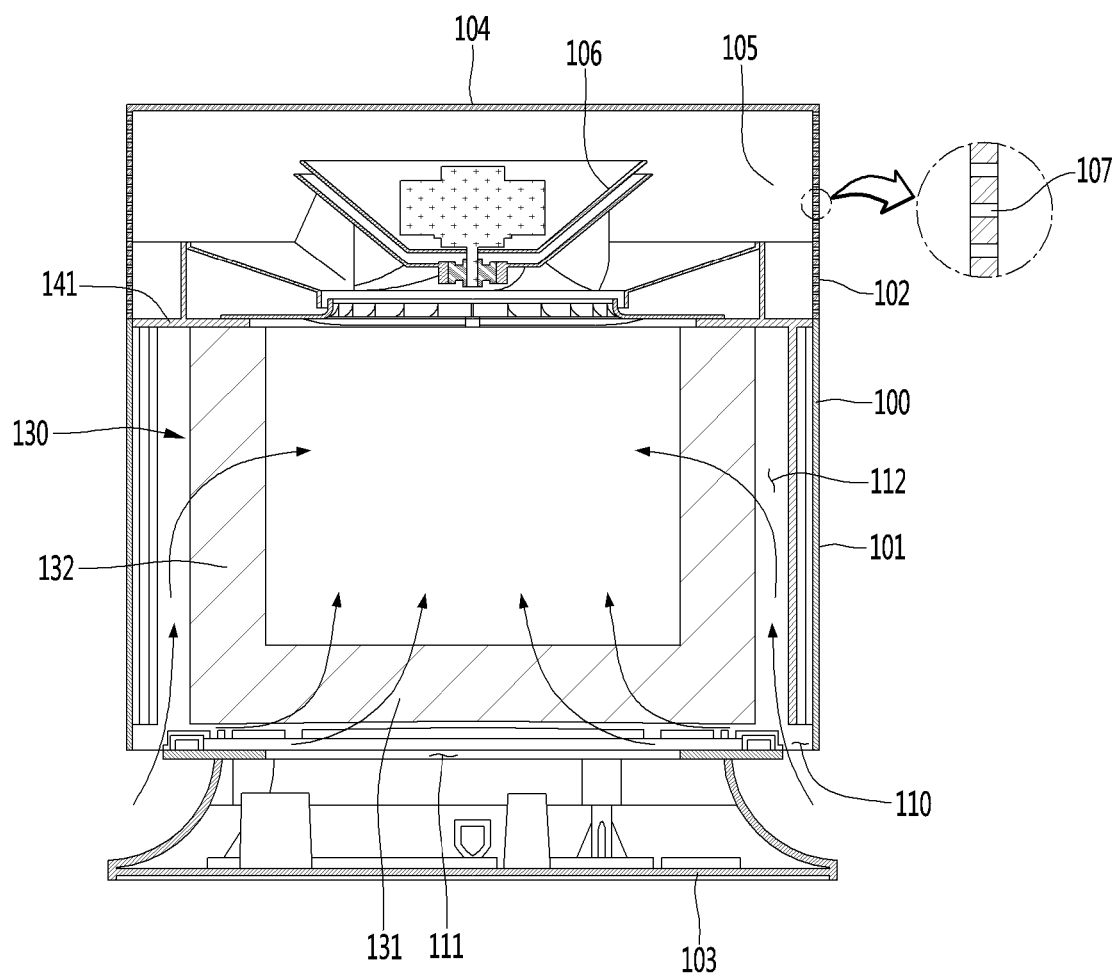
FIG. 6 is a schematic cross-sectional view of A-A' of FIG. 2.

Referring to FIG. 6, the base air purifier 1 may include the outer wall 100 extending in the vertical direction. The suction port 110 may include an opening formed at a bottom of the closed wall 101. A base 103 may be provided below the outer wall 100 and seated on a floor, ground counter, etc. The base 103 may have a concave curvature so as to have a cross-sectional area that reduces in an upward direction toward the closed wall 101 so as not to obstruct the suction port 110. Contaminated air may be guided in a space between the base 103 and the outer wall 100 to flow through the suction port 110.

The air suctioned through the suction port 110 at a bottom of the closing wall 101 may be guided to a filter 130, and clean air passed through the filter 130 may be discharged out of the discharge wall 102. The filter 130 may include a lower or bottom surface 131 and a side surface 132. Air introduced through the suction port 110 may be suctioned into a first suction passage 112 provided at a side of the side surface 132 and a second suction passage 111 provided below the bottom surface 131 of the filter 130. The side surface 132 may be cylindrical and the bottom surface may cover a bottom of the side surface 132. Air may be suctioned through the filter 130 from all radial directions and also from below in an axial direction. Since the filter 130 may have a large suction area, a resistance to air flow and noise may be reduced. In addition, more air may be filtered or purified per unit time.

The first suction passage 112 may be defined as a space between the closed wall 101 and the side surface 132 of the filter. The second suction passage 111 may be defined as a space or gap between the base 103 and the bottom surface 131 of the filter. Air may not be suctioned through the closed wall 101, and the closed wall 101 may create a distance between the suction port 110 and the discharge wall 102 so as to prevent or reduce clean discharged air from being resuctioned and refiltered, improving a filtering performance of the filter 130.

A fan 106 may suction air through the suction port 110 and discharge air through the discharge wall 102. The fan 106 may be house din a fan housing 105. The fan 106 and fan housing 105 may be provided at an outlet side of (i.e., above) the filter 130. An upper opening formed by the outer wall 100 may be closed by the upper seating surface 104. The portable air purifiers 2 and/or 3 may be placed on an upper surface of the upper seating surface 104.

The fan 106 may provide a negative pressure. Air filtered through the filter 130 may be discharged by the fan 106 to a periphery of the fan 130 (i.e., in a radial direction) toward the discharge wall 102. The discharge wall 102 may include a plurality of holes 107 (e.g., micro holes) formed therein. The air discharged by the fan 106 may be discharged through the plurality of micro holes 107 formed in the discharge wall 102.

An inner frame 141 may be provided in the outer wall 100 to extend horizontally and/or parallel to the upper seating surface 104. An upper end of the discharge wall 102 may be sealed (e.g., bonded, welded, adhered, or fused) with an edge of the upper seating surface 104, and an outer end or side of the inner frame 141 may be sealed with a lower end of the discharge wall 102 and/or an upper end of the closed wall 101. The inner frame 131 may be configured to prevent or reduce suctioned air from being discharged through the discharge wall 102 without having first passed through the filter 130. The inner frame 141 may be sealed with an inner surface of the outer wall 100 at a same or similar point where a boundary between the discharge wall 102 and the closed wall 101 is provided.

The microholes 107 may be configured to discharge clean air discharged by the fan 106 back into an indoor space at a predetermined flow rate or less. The microhole 107 may have a diameter of about 1 millimeter or less. The microholes in the drawings may be exaggerated in size for clarity. The microholes 107 may be smaller than the suction holes 34 provided in the portable air purifier 2,3, as the suction holes 34 may have a diameter in the range of several millimeters to several tens of millimeters.

At least 100,000 microholes 107 may be formed in the discharge wall 102. For example, several hundreds of thousands of microholes 107 may be provided. A size and number of microholes 107 may be configured such that a flow rate of clean air through the microhole 107 is 0.25 m/s or less (e.g., 0.15 m/s or less). Clean air discharged at such a rate may be referred to as a no-wind condition, which is difficult for the user to feel wind. Since a discharging operation may be configured to minimize a flow rate of discharged air, the base air purifier 1 may be capable of a windless or "no-wind" operation mode.

In the windless operation mode, a rotation speed of the fan 106 may be low, further reducing a flow rate of air, noise, and power consumption. The user may not be able to recognize (i.e., hear or feel) discharged air and/or fan 106 in the windless operation mode. The windless operation mode may be operated in a 24-hour air purifying mode or state in which the base air purifier 1 is continuously operated.

The base air purifier 1 may also be operated in a base driving mode that is different from the windless operation mode. In the base driving mode, the fan 106 may be rotated at a higher speed such that the flow rate of discharged air through the microhole 107 may exceed 0.25 m/s. At such a rate, the user may hear noise from the base air purifier 1 and feel air discharged toward the user, but air may be purified more quickly. The fan 106 may be driven at moderate speeds (i.e., an air purifying mode) or relatively high speeds (i.e., a rapid air purifying mode).

A control module or controller 10 (FIG. 8) of the base air purifier 1 may control a rotational speed of the fan 106. Rapid air purifying may be performed based on a sensed air quality of the room or a user's preferences, while the windless mode may be performed when air quality is near perfect in order to maintain a clean state. In such a state, minimal air purifying may be required. The rotational speed of the fan 106 may be continuously increased or decreased in proportion to a sensed air quality.

A sensor 11 (FIG. 8) may be configured to sense an air quality, dust, or pollution level. The rotational speed of the fan 106 may be controlled by the controller 10 based on information received by the sensor 11. As an example, the controller 10 may store a predetermined low air quality (indicating high pollution) and a predetermined high air quality (indicating low pollution). When the sensor 11 indicates that a sensed air quality is at or below the predetermined low air quality, the controller 10 may drive the fan 106 at a predetermined high speed or higher. When the sensor 11 indicates that a sensed air quality is at or above the predetermined high air quality, the controller 10 may drive the fan 106 at a predetermined low speed or lower. As another example, the controller 10 may store a predetermined target air quality, and control the fan 106 based on how much the sensed air quality indicated by the sensor 11 is above or below the predetermined target air quality. The user may preset the predetermined target air quality and/or the predetermined high and low air qualities in the previous example.

Figure 7:
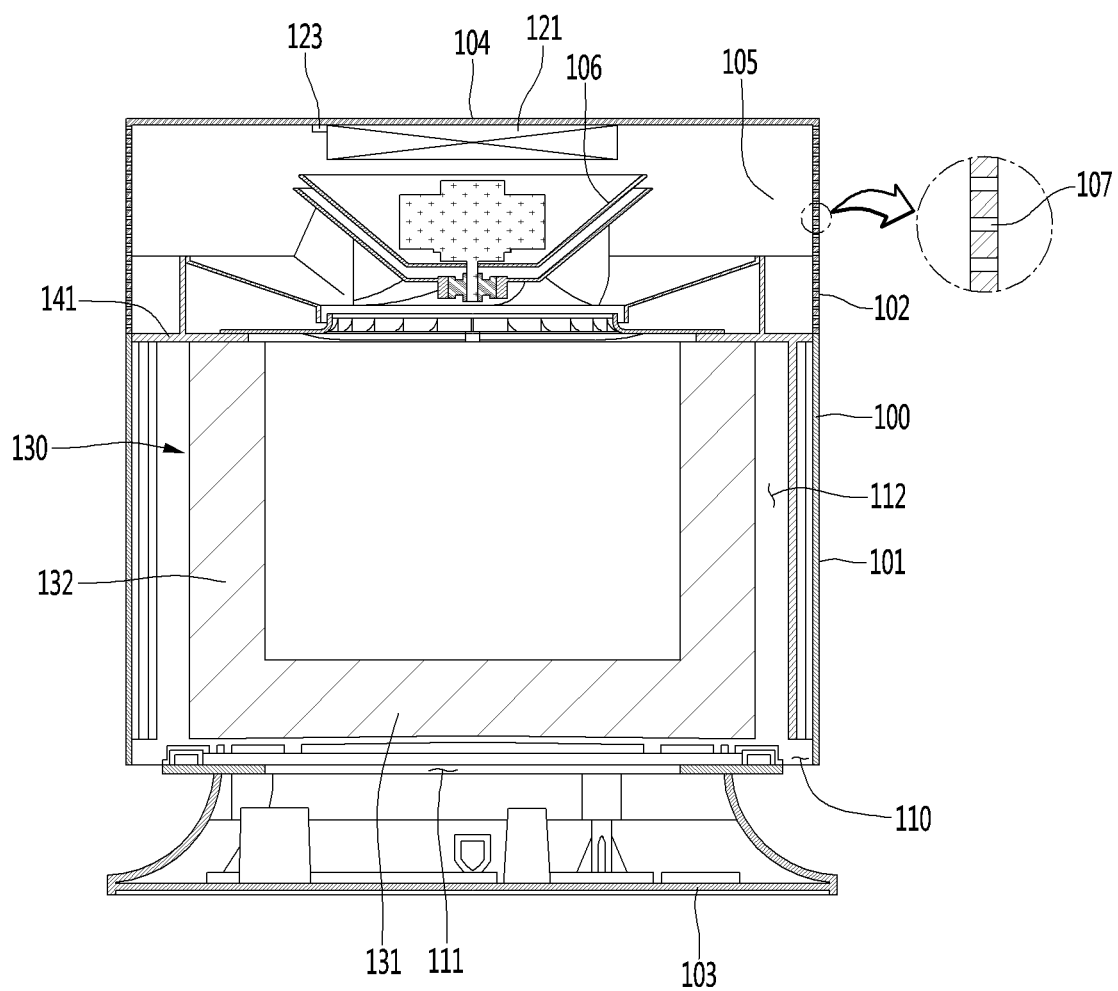
FIG. 7 is a schematic cross-sectional view of B-B' of FIG. 2.

Referring to FIG. 7, a wireless charging module 121 may be provided in an upper portion of the base air purifier 1 below or at the seating surface 104. A position of the wireless charging module 121 may correspond to a position of the wireless charging module 38 provided in the base 35 of the portable air purifier 2, 3. The wireless charging module 121 of the base air purifier 1 may extend to be under both left and right sides of the base air purifier 1 to align with the wireless charging modules 38 of the portable air purifiers 2, 3. For convenience of description, the wireless charging module 121 of the base air purifier 1 may be referred to as a first wireless charging module, and the wireless charging module 38 of the portable air purifier 2, 3 may be referred to as a second wireless charging module 38. The first wireless charging module 121 may wirelessly supply energy to the second wireless charging module 38 when the portable air purifier 2 or 3 is seated on the upper seating surface 104 of the base air purifier 1 to charge batteries of the portable air purifiers 2 and/or 3.

A seating sensor 123 may be provided at a position adjacent to the first wireless charging module 121 to detect a seating of the portable air purifier 2 or 3. The base air purifier 1 may include two seating sensors 123 to correspond to each portable air purifier 2 or 3. When the seating sensor 123 detects a seating of a portable air purifier 2, 3, the first and second wireless charging modules 121 and 38 may interact with each other and perform a wireless charging operation (e.g., an electromagnetic induction method via coils).

A second fan 106 and a second fan housing 105 may be provided inside the base air purifier 1. The first and second fans 106 may be provided at left and right sides, respectively, inside the base air purifier 1. Alternatively or in addition hereto, the base air purifier 1 may have three or more fans 106 and fan housings 105. For example, a third fan 106 and fan housing 106 may be provided at a center between the first and second fans 106. Such fans may operate similarly to the previously described fan 106, and may similarly be controlled by the controller 10. The filter 130 may have a size configured to extend under all fans 106. For example, the filter 130 may have an elliptical or stadium shape corresponding to an inner contour of an inner surface of the outer wall 100. Alternatively, there may be multiple filters 130 corresponding to multiple fans 106.

The second fan 106 and/or any additional fans may be operated when a strong cleaning capacity is needed (e.g., when the sensor 11 indicates very poor air quality). As an example, when a normal level of air purifying function is performed or the base air purifier 1 is operated in the windless operation mode, the first fan 106 may be operated, while the second fan 106 may be turned off. During a rapid air purifying mode, the second fan 106 and/or any additional fans may be operated together with first fan 106 for a stronger air purifying function.

Alternatively, the first, second, and any other fans 106 may be operated and controlled together to be synchronized. In the windless operation mode, for example, each of the first and second fans 106 may be operated, but at a very low rotation speed so as to reduce noise, power consumption, and a flow rate of discharged air through the microholes 107.

In a rapid air purifying mode, a flow rate of clean air passing through the microhole 107 may be high, and noise and power consumption may be increased. The rapid air purifying mode may be performed only by the first fan 106 being rotated at a very high speed, or by both first and second fans 106 at high speeds. Multiple fans 106 may be provided to reduce a load on any single fan 106. In addition, when the portable air purifiers 2, 3 are seated on the base air purifier 1, fans 41 of the portable air purifiers 2, 3 may be rotated at a higher speed so as to more quickly purify air.

The 24-hour air purifying state may be implemented so that an air quality of the indoor space may be maintained at a constant level. During the 24-hour air purifying state, the air purifier may be continuously operated and adjusted to address various sensed air qualities automatically even without a command of the user.

The user may also input commands. The 24-hour air purifying mode may be performed based on the windless operation mode. When a sudden increase in air pollution is sensed, the user may be informed via the display 42 (FIG. 5) of a docked portable air purifier 2, 3 and/or via a sound, alarm, or display provided on the base air purifier 1. The display 42 of the portable air purifier 2, 3 and/or the base air purifier 1 may include a user interface (e.g., touch screen or button) in which the user may input a command, and the user may select a rapid air purifying mode. Selecting the rapid air purifying mode may operate all of the base and portable air purifiers 1, 2, and/or 3. Alternatively, the user may choose to place one of the portable air purifiers 2 in a separate room and choose a different operating mode for that particular portable air purifier 2. As another alternative, only the base air purifier 1 may be operated in the rapid air purifying mode. A number and/or combination of base and portable air purifiers 1, 2, and/or 3 operated in the rapid air purifying mode may be based on a seating of the portable air purifiers 2, 3 and/or positions of the portable air purifiers 2, 3.

In the 24-hour air purifying state in a windless mode, a rotation speed of the fans 106 may be minimized so that a slight amount of air purifying is always performed. In the 24-hour air purifying state in a windless mode, all light emitting devices of the base air purifier 1 may be turned off. When a poor air quality is detected, at least one of the fans 106 and/or 41 of the base or portable air purifiers 1, 2, 3 may be driven at a higher speed until the air quality returns to a predetermined target air quality or predetermined target air quality range. Once air quality returns to the predetermined target air quality range, the fans 106 and/or 41 are stopped, driven at a lower speed, or driven according to a user's command.

A general operation mode may be a mode that is based on the user's command. The general operation mode may be similar to the windless mode in the 24 hour state, except that a base speed of the fan 106 may be based on the user's selection instead of at a minimum speed or based on a predetermined air quality range. For example, the user may command the fan 106 to operate at a moderate speed. Alternatively or in addition thereto, when a sensed air quality falls outside of a predetermined air quality range (which may be selected by the user), the fans 106 and/or 41 may be temporarily sped up until the air quality returns to the predetermined air quality range, after which the fans 106 and/or 41 return to operating based on the user's command.

The portable air purifiers 2,3 may also be operated in the windless mode or in the general operation mode based on the user's command. The user may choose different settings for each portable air purifier 2,3. In addition, each portable air purifier 2,3 may also have an air quality sensor and may respond to air quality sensed in a room where the portable air purifier 2,3 is placed. The fans 41 of the portable air purifiers 2, 3 may be driven at different speeds based on different commands selected by the user or based on different sensed air qualities.

Figure 8:
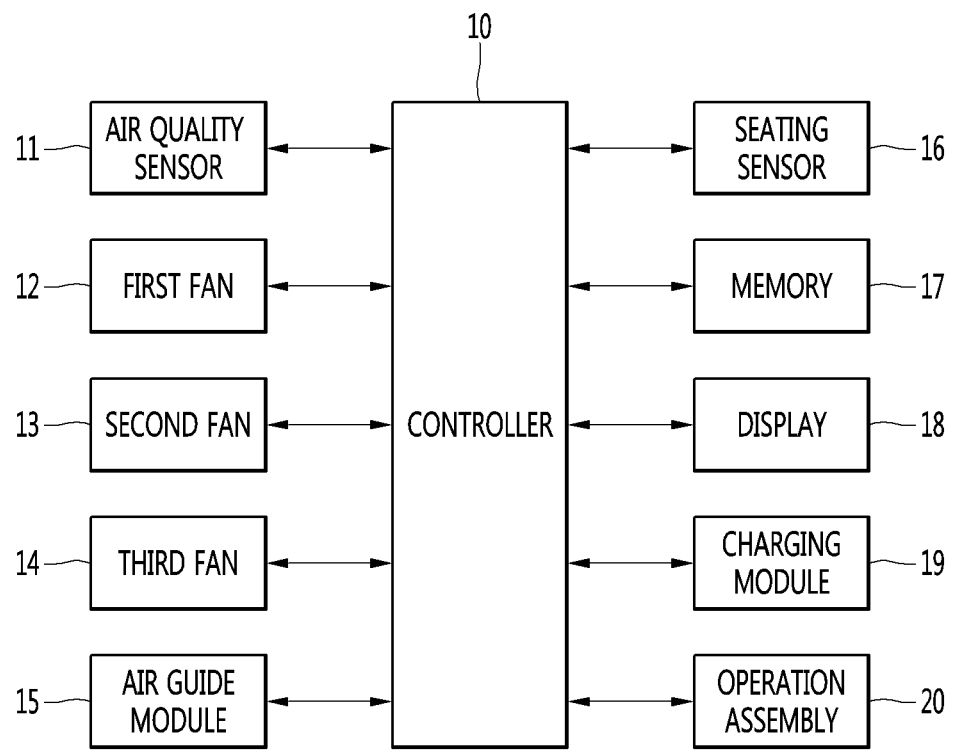
FIG. 8 is a block diagram of a base air purifier.

Referring to FIG. 8, devices of the base air purifier 1 may be designated with different reference numerals than previously used with reference to FIGS. 1-7. For example, the fans 106 of the base air purifier 1 shown in FIGS. 6-7 may be designated by reference numerals 12 through 14 in FIG. 8.

The base air purifier 1 may include a controller 10, which may operate each component shown in FIG. 8. The user may set the operation mode or state through a user interface of operation module 20 (e.g., touch screen). For example, the user may select the 24-hour air purifying mode described above using the user interface 20. A selection of the user may be stored in a memory 17. The controller 10 may receive an input of the user by reading necessary information from the memory 17 and operate the first, second and third fans 12, 13 and 14 accordingly. However, a number of fans in the base air purifier 1 is not limited to three.

In the 24-hour purifying state, the base air purifier 1 may be operated in a windless mode. In the windless mode, the first, second, and third fans 12, 13, and 14 may be turned off and/or operated at a low speed. The base air purifier 1 may be configured such that any combination of the first, second, and third fans 12, 13, and 14 may be operated in the windless mode. Clean air may be discharged at a low speed through microholes, and a direction of air may be changed by an air guide module 15.

The implementation of the 24-hour purifying state and/or windless mode may be displayed on a display 18. After a certain period of time has elapsed, the display 18 may be turned off.

During the 24-hour purifying state, an air quality sensor 11 may continuously measure or sense air quality. When the measured air quality is bad (i.e., below a predetermined air quality range), the windless operation mode may be terminated and a rapid air purifying mode or other air purifying mode be operated.

If the portable air purifiers 2, 3 are not seated on the base air purifier 1 and and/or are determined to be far away from the base air purifier 1, and if the controller 10 also determines that the base air purifier 1 alone is insufficient to improve the sensed air quality, the display 18 may display a recommendation to the user to seat the portable air purifiers 2 and/or 3 on the base air purifier 1. If the portable air purifiers 2 and/or 3 are seated on the base air purifier 1, the controller 10 may control the portable air purifiers 2 and/or 3 based on the sensed air quality by the sensor 11.

Each of the base air purifier 1 and portable air purifiers 2 and 3 may have a communication module so that the base air purifier 1 and portable air purifiers 2 and 3 may communicate air quality data, seating information, etc. The base air purifier 1 may also have a seating sensor 16 to sense whether the portable air purifiers 2 and/or 3 are seated on the seating surface 104 of the base air purifier 1. There may be two seating sensors 16 corresponding to each portable air purifier 2 and 3. Seating information may be stored in the memory 17. The portable air purifiers 2 and/or 3 may be automatically operated based on information from the seating sensors 16 and the air quality sensor 11. When the air quality is improved (i.e., when the sensor 11 senses an air quality within the predetermined air quality range), the base air purifier 1 and/or any seated portable air purifiers 2 and/or 3 may be operated in the windless mode.

The controller 10 may control a charger or wireless charging module 19 to start charging the portable air purifier 2 or 3 when the seating sensor 16 indicates that the portable air purifier 2 or 3 is charged. A charge amount may be displayed on the display 18.

Figure 9:
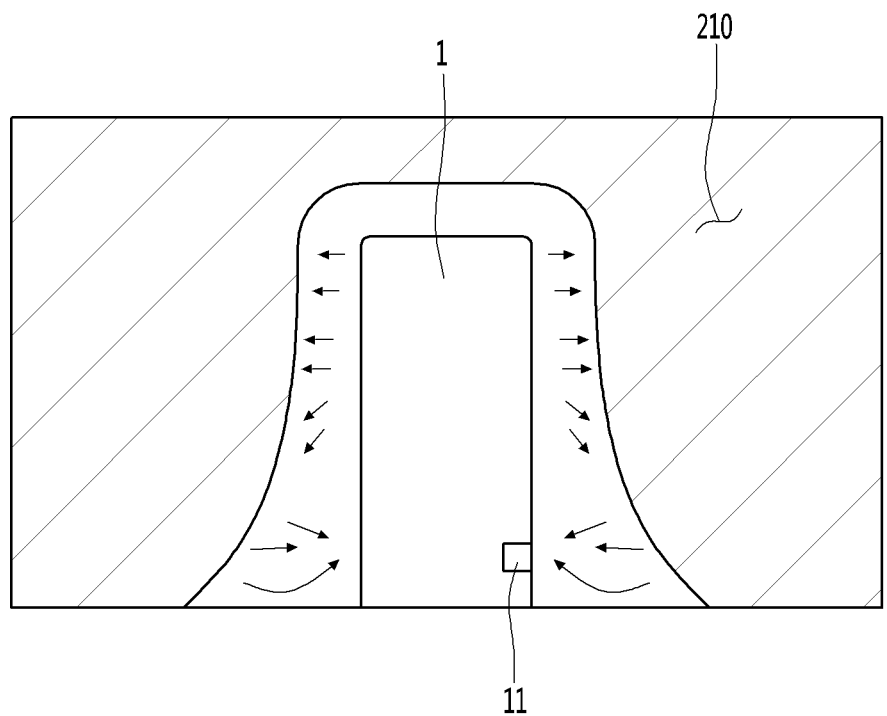
FIG. 9 is a view explaining an operation of a windless or quiet operation mode.
Figure 10:
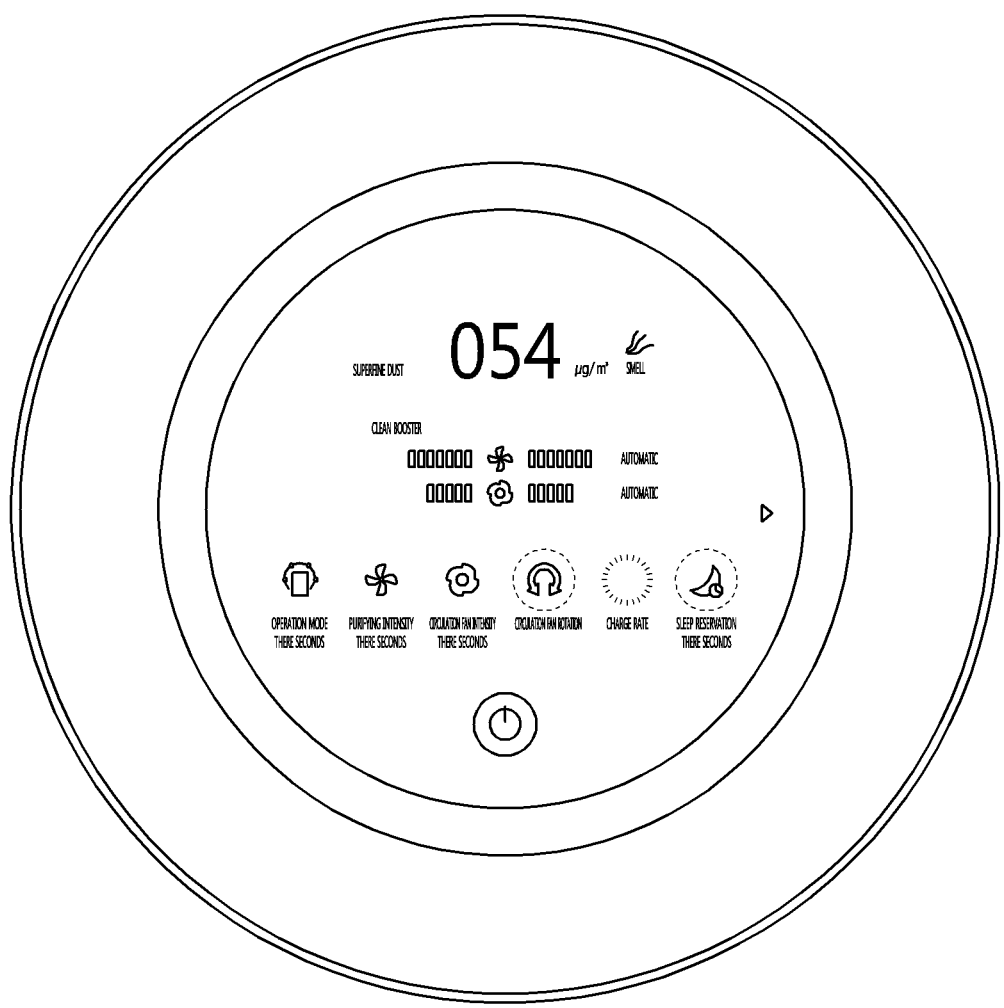
FIG. 10 is a plan view of a display of a portable air purifier.

Referring to FIGS. 6 and 9, the base air purifier 1 may be placed in a predetermined space or room and operated in the windless mode. During the windless mode, the base air purifier 1 may discharge clean air at a small flow rate through the microhole 107. As shown by the arrows, clean air may be discharged laterally (i.e., radially) through the microholes 107 at an upper portion of the air purifier 1, but may lose its directionality and be dispersed very soon after being discharged. As a result, clean air may not directly affect far areas or a region close to the closed wall 102, where air or other gas particles may move more freely.

A region further away from the base air purifier 1 may be referred to as a Brownian motion region 210 where gas, air, and foreign matter in the air may move according to Brownian motion and be freely diffused. The Brownian motion region 210 may be spaced a certain distance from the base air purifier 1 and may have a boundary line. Air discharged from the microsholes 107 may enter the Brownian motion region 210 so as not to return the suction port 110. A flow rate of air around the suction port 110 may be larger than in the Brownian motion region 210, and a size of the Brownian motion region 210 may be reduced toward the suction port 110. The boundary line of the Brownian motion region 210 may be curved away from the suction port 110. Air supplied to the suction port 110 may come from the Brownian motion region 210. As an operation time elapses in the windless mode, more air may be cleaned and be dispersed freely to maintain a clean state of the room, while noise and power consumption may be reduced.

Referring to FIGS. 2-3, 5, and 10, the portable air purifiers 2 and 3 may be operated independently away from the base air purifier 1, and operating states may be displayed on the display 42 of the portable air purifier 2, 3. When the portable air purifier 2, 3 is placed on the seating surface 104 of the base air purifier 1, a charge (e.g., a charging amount or a charging rate) may also be displayed on the display 42 of the portable air purifier 2 3.

The portable air purifier 2, 3 may be placed on and guided to a predetermined seating position of the seating surface 104. The seating surface 104 may be configured to prevent an overturning of the portable air puffier 2, 3 during seated. For example, the seating surface 104 may have a portion that is slightly recessed downward to receive a bottom of the portable air purifier 2, 3. However, embodiments disclosed herein are not limited hereto.

Figure 11:
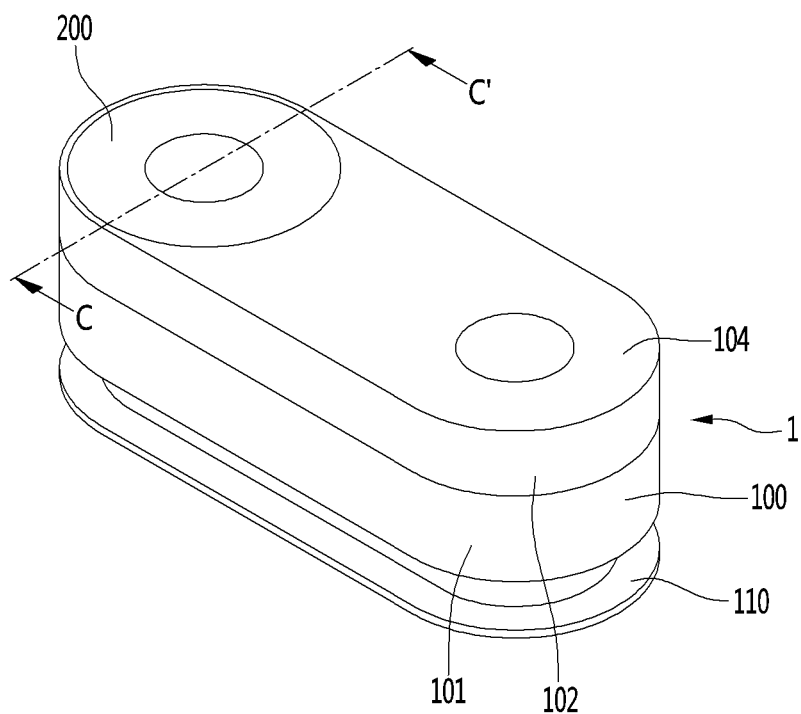
FIG. 11 is a perspective view of a base air purifier or docking station according to another embodiment.
Figure 12:
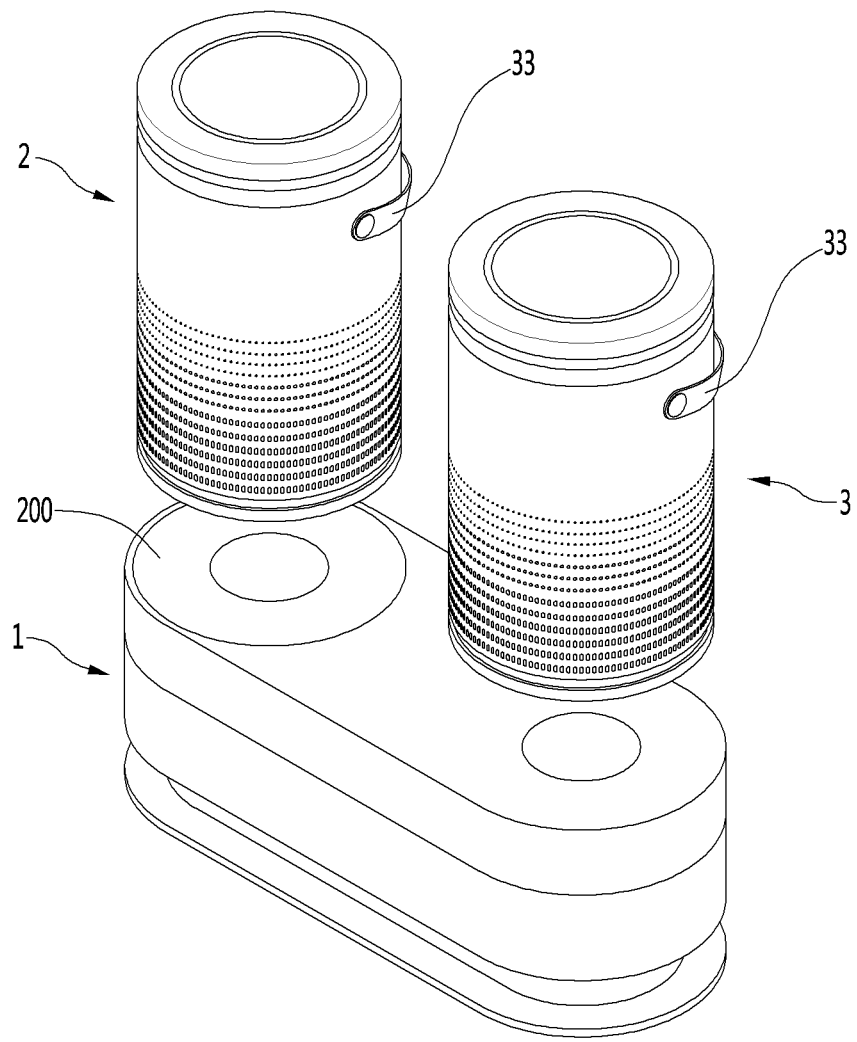
FIG. 12 is a view showing a use state of a seating plate.

For example, referring to FIGS. 11 and 12, the seating surface 104 may have a seating plate 200 on which the portable air purifier 2,3 is placed. There may be two or more seating plates 200 to correspond to each portable air purifier 2, 3. The seating plate 200 may be slightly larger than a lower surface of the portable air purifier 2, 3 so that the user may conveniently position the portable air purifier 2, 3 at a predetermined position. A portion of the seating surface 104 may be recessed downward to form a seating groove or recess 220 (FIG. 13) below the seating plate 200. When the portable air purifier 2, 3 is seated on the seating plate 200, the seating plate 200 may move downward into the seating groove 220, and an edge of the seating surface 104 and/or a side surface or inner wall of the seating groove 220 may maintain a stable position of the portable air purifier 2, 3 to prevent overturning. Even if the user does not place the portable air purifier 2,3 perfectly in a center of the seating plate 200, the seating plate 200 may be large enough such that the portable air purifier 2, 3, and seating plate 200 descend slightly into the seating groove 220 of the seating surface 104. A shape of the base 35 and/or the outer wall 31 of the portable air purifier 2, 3 may be configured to correspond to an inner contour formed by the descended seating plate 200 (at a bottom) and inner wall of the seating groove 220 (at a side).

Figure 13:
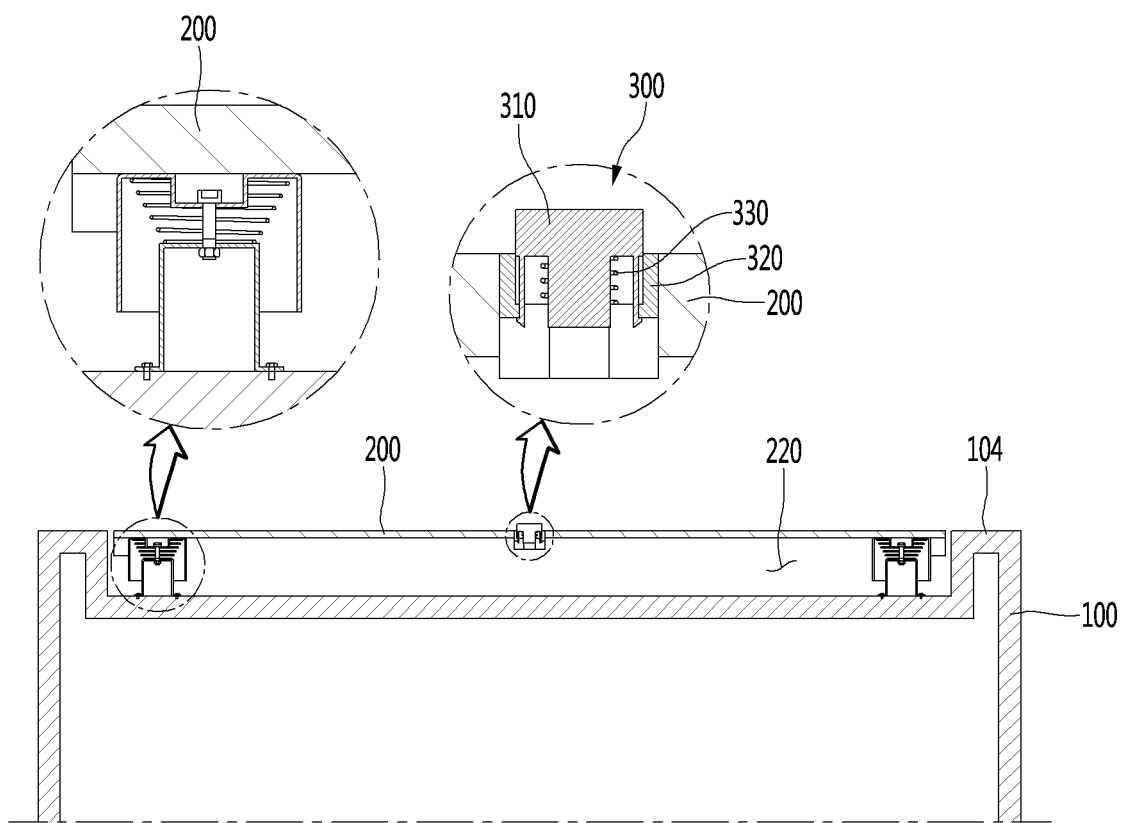
FIG. 13 is a partially cut cross-sectional view of an upper seating surface.

Referring to FIG. 13, the seating plate 200 may move up and down within the seating groove 220. A seating sensor 300 (similar to seating sensor 16 in FIG. 8) may be provided on the seating plate 200 to sense whether the portable air purifier 2,3 is seated on the seating plate 200. Wireless charging may be automatically performed when the seating sensor 300 indicates that the portable air purifier 2, 3 is seated on the seating plate 200. The first wireless charging module 121 may be provided below a bottom surface of the seating groove 220.

A lifting or guiding device or mechanism 400 may be provided between the seating plate 200 and the seating groove 220. The lifting device 400 may be a cushion to support the seating device 200. The lifting device 400 may be an elastic member (e.g., spring, cushion, or a foam material) that compresses by a weight of the portable air purifier 2, 3 and pushes the seating plate 200 back up when the portable air purifier 2, 3 is removed from the seating plate 200. Embodiments of the lifting device 400 are not limited to elastic members; for example, a linear actuator, motor, or hydraulic or pneumatic press or motor may be used to raise and lower the seating plate 200.

The seating sensor 300 may be a light sensor, a hall sensor, a touch sensor, etc. FIG. 13 exemplifies a touch or spring sensor implemented as the seating sensor 300. The seating sensor 300 may be configured to protrude slightly from an upper surface of the seating plate 200 so that, when the portable air purifier 2, 3 is seated on the seating plate 200, the portable air purifier 2, 3 may contact and push down on the seating sensor 300.

The seating sensor 300 may include a sensing block 310 protruding from the seating plate 200, a housing 320, and an inner spring 330 on which the sensing block 310 may rest. When the portable air purifier 2,3 is placed on the seating block 310, the internal spring 330 may contract or compress such that the sensing block 310 is lowered and a bottom of the air purifier 2, 3 may evenly contact the seating plate 200. When the portable air purifier 2, 3 is removed, the internal spring 330 may expand and the seating block 310 may protrude from the seating plate 200. The seating sensor 300 may sense a compression and expansion of the internal spring 330 or may sense a movement of the housing 320 and/or the sensing block 310 to detect a seating of the air purifier 2, 3. The seating sensor 300 may be installed through a center of the seating plate 200, and a user may intuitively place the portable air purifier 2, 3 on a center seating plate 200 by using a position of the seating sensor 300 as a guide.

Figure 14:
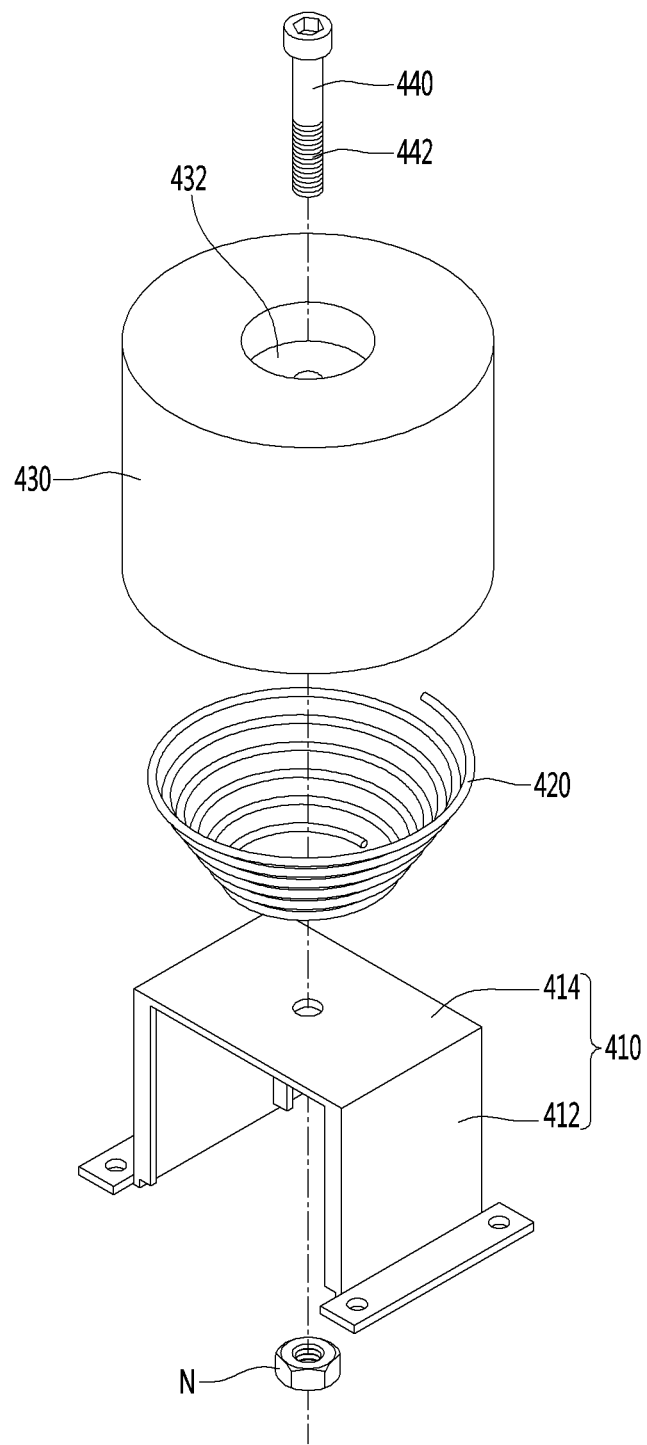
FIG. 14 is an exploded perspective view of a lifting device.
Figure 15:
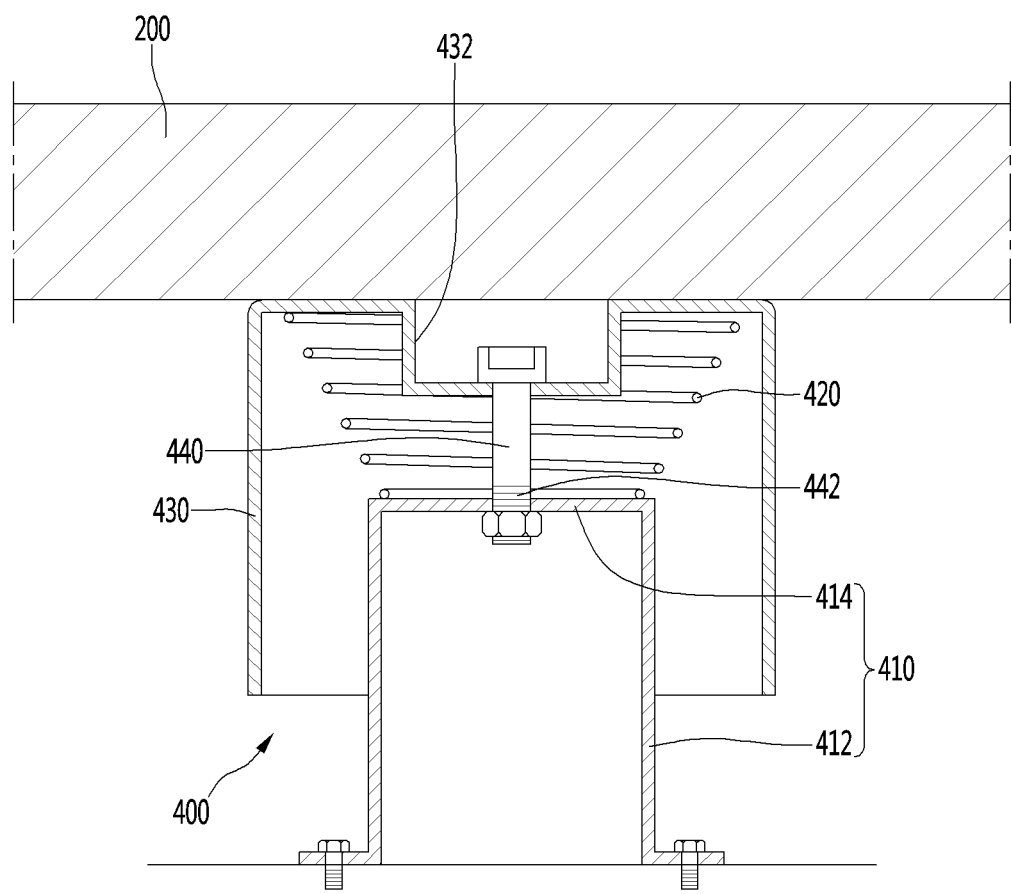
FIG. 15 is a sectional view of a lifting device.
Figure 16:
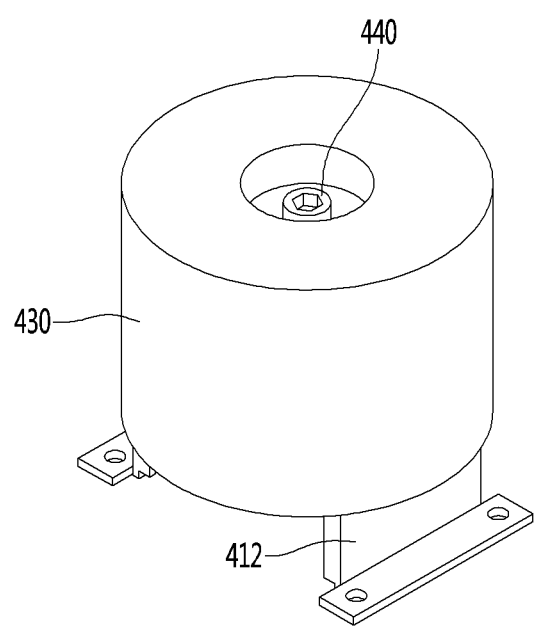
FIG. 16 is a perspective view of a lifting device.

The seating plate 200 may smoothly ascend and descend via the lifting device 400 when the portable air purifiers 2 and/or 3 are seated. Referring to FIGS. 14-16, the lifting device 400 may include a support 410, an elastic member or spring 420, and a lift portion or cover 430.

The support 410 may be a rigid wall or frame that supports the elastic member 200 and a weight of the seating plate 200 such that, even when the portable air purifiers 2 and 3 are seated on the seating plates 200, the seating plate 200 may not be lowered completely into the seating groove 220 (FIG. 13). The support may include two vertical supporting pieces or walls 412 in the form of plates that face each other. The two vertical walls 412 may be coupled to a bottom surface of the seating groove 220 (FIG. 13). A horizontal support or plate 414 may couple and/or rest on upper ends of the vertical walls 412. The horizontal plate 414 may extend parallel to the seating plate 200.

The elastic member 420 may support a stable descent of the seating plate 200 when the portable air purifier 2, 3 is seated and an automatic rise of the seating plate 200 when the portable air purifier 2, 3 is removed. The elastic member 420 may be a coil spring having a diameter that decreases from an upper end to a lower end. The lower end of the elastic member 420 may be seated on the horizontal plate 414, while the upper end of the elastic member 420 may be wider so that a weight of the portable air purifier 2, 3 may be evenly applied.

The cover 430 may have a cap structure or a cylindrical shell having a top. An inside of the cover 430 may be hollow so that the cover 430 may cover the elastic member 320 and at least a portion of the support 410. An upper surface of the cover 430 may rest on the upper end of the elastic member, and the seating plate 200 may rest on the upper surface of the cover 430. The upper surface of the cover 430 may be flat in the horizontal direction so that the seating plate 200 may evenly rest on the cover 430.

The cover 430 may cover an upper side of the support 410. A recess or groove 432 may be recessed downward and/or inward from a center of the upper surface of the cover 430. The recess 432 may have an opening or screw hole in which a screw or guide rod 440 having threads 442 may be inserted. The guide rod 440 may be inserted through the elastic member 520 and through a hole formed in the upper surface of the horizontal plate 414. A nut N may be screwed onto the threads 442, which may protrude below the horizontal plate 414, to fix the guide rod 440 in place and secure the cover 430, elastic member 420, and support 410.

The guide rod 440 may have a cylindrical rod shape, and the threads 442 may be formed on a lower portion. The lower portion of the guide rod 440 may penetrate centers of the elastic member 420, the horizontal plate 414, and the cover 430. The lower end of the elastic member 420 may have a natural opening that is wider than a width or thickness of the guide rod 440 while the upper end of the elastic member 420 may contact the top of the cover 430 at a position outside of the recess 432 so that the elastic member 420 may freely expand and contract or compress. The holes in the recess 432 of the cover 430 and the horizontal plate 414 may be configured to loosely correspond to (i.e., may be slightly larger than) the width of the guide rod 440. An interior of the nut N may have threads that are configured to engage with the threads 442 of the guide rod 440.

The lifting device 400 may be installed near a corner or edge of a bottom of the seating plate 200 when viewed from above. There may be a plurality of lifting devices 400 that are spaced apart at equal intervals around the edge of the seating plate 200. For example, if the seating plate 200 has a square shape, there may be a lifting device 400 under each corner. If the seating plate 200 has a circular shape, there may be four lifting devices 400 that are spaced 90 degrees apart from each other. However, embodiments disclosed herein are not limited hereto. A number and position of the lifting devices 400 may be configured such that the entire seating plate 200 may be stably supported.

When the portable air purifier 2, 3 is placed on the seating plate 200, the portable air purifier 2, 3 may stably descend at a proper speed as the elastic member 420 is compressed in the descending process. When the portable air purifier 2, 3 is lifted and removed from the seating plate, the elastic member 420 may expand upward by a spring force. During an expansion and compression of the elastic member 420, the seating plate 200, cover 430, and guide rod 440 may all also be raised and lowered.

Figure 17:
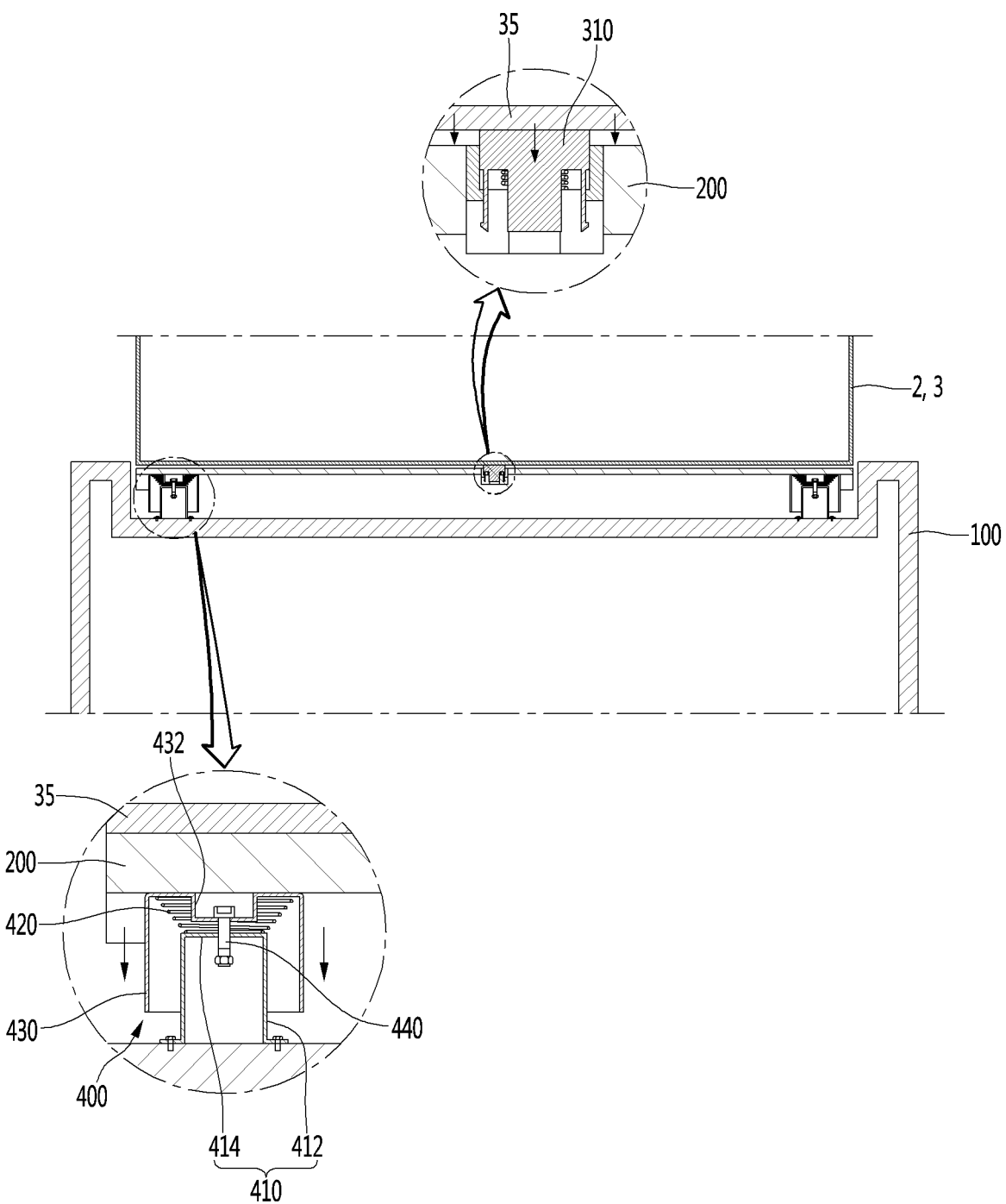
FIG. 17 is a view showing a state in which the seating plate is moved downward due to a weight of the portable air purifier when the portable air purifier is seated on the base air purifier.

FIG. 13 may show an expanded or natural state of the elastic member 230 when the portable air purifier 2, 3 is not seated on the seating plate 200, while FIG. 17 may show a compressed state of the elastic member 230 when the portable air purifier 2, 3 is seated on the seating plate 200. Referring to FIG. 17, when the portable air purifier device 2, 3 is placed on the upper surface of the seating plate 200, the seating plate 200 and the sensing block 310 may be pressed down by the weight of the portable air purifier 2, 3. As a result, the elastic member 420 may be compressed, the cover 430 may descend, and the guide rod 440 may be further inserted downward through the hole of the horizontal plate 412.

As the cover 430 descends, the entire seating plate 200 may smoothly descend downward. As the elastic member 420 is compressed during the descending of the cover 430, the seating plate 200 may be stably and slowly lowered, as an upward elastic force may keep the seating plate 200 from dropping or falling immediately downward.

When the portable air purifier 2, 3 is lifted and removed from the seating plate 200, the cover 430 may be moved upward by the elastic force of the elastic member 420, as the elastic member 420 may expand since a weight of the portable air purifier 2, 3 is not compressing the elastic member 420. As the cover 430 is lifted up, the entire seating plate 200 may smoothly ascend. The user may be able to lift the portable air purifier 2, 3 with a small force, as the elastic member 420 may push the portable air purifier 2, 3 upward when a load is even slightly reduced.

Since a plurality of lifting devices 400 may be provided to evenly distribute an elastic force, lifting and lowering of the seating plate 200 may be stable, and the seating plate 200 may not be caught in the seating groove 220. A pushing action of the elastic members 420 may be uniform on a periphery of the seating plate 200 to prevent a tipping of the seating plate 200 within the seating groove 220. The portable air purifier 2, 3 may be supported in the inner surface of the seating groove 220 when the portable air purifier 2,3 is completely inserted into the seating groove 220 during seating, which may prevent an overturning in the case of an external impact or force. An edge of the seating plate 200 may have an optional rim or flange extending downward to be radially outside of the elastic members 420 and/or the cover 430 so as to maintain a position of the seating plate 200 within the seating groove 220 and to prevent sliding.

This application is related to U.S. application Ser. No. 16/821,806 filed on Mar. 17, 2020 and Ser. No. 16/821,871 filed on Mar. 17, 2020, the entire contents of which are hereby incorporated by reference.

Embodiments disclosed herein may perform various air cleaning or purifying operations corresponding to an indoor space by using a single air cleaning or purifying system provided with a plurality of air purifiers. Industrial application may be highly expected. Stable handling of a portable air purifier may be achieved, and a stable engagement with a plurality of portable air purifiers and a base or main air purifier may be maintained when the portable air purifiers are mounted on the base air purifier. The portable air purifier may be stably positioned to prevent overturning of the portable air purifier. The user may conveniently place the portable air purifier on an appropriate upper surface of the base air purifier, making handling convenient.

Embodiments disclosed herein may provide an air cleaning or purifying system which is capable of being operated in various modes or combinations of air purifiers in accordance with a residential environment of a customer by using a single air purifying system. The air purifying system may always maintain an indoor space in a comfortable state regardless of a user's perception of air quality in order to improve a user's health. The air purifying system may be handled conveniently by the user.

Embodiments disclosed herein may be implemented as an air purifying system including a base, docking station, or cradle having an upper seating surface which may be a flat upper surface, at least one seating groove formed by being recessed downward in the upper seating surface, a seating plate that ascends and descends within the seating groove, and at least one air purifier seated on the seating plate of the base. Such a configuration may prevent the air purifier from overturning. As the seating plate is raised and lowered, the convenience of use of the base can be improved in a state in which the cradle may be improved when the base is lifted and lowered, and overturning of the air purifier may be prevented when the seating plate is lowered.

A lifting device may be provided between the seating plate and the seating groove to maintain a stable movement of the seating plate so that a weight of the seating plate may be supported and lifted and descended smoothly. The lifting device may be provided at at least two places at a periphery of the seating plate so that the entire seating plate may be lifted and lowered.

The lifting device may include an elastic member that provides a force that may push the bottom of the seating plate upward when the air purifier is mounted so that a smooth seating action may be guided. The seating plate may be provided with a seat sensor to sense a seating or mounting of the air purifier so that when the air purifier and the cradle or base interact with each other, a controller may be notified that the air purifier is seated. Seating information may be used to control the cradle and air purifier. For example, a charging operation of the air purifier may be based on seating information received by the controller.

The cradle may be implemented as a base air purifier provided with a fan and a filter. An air purifying action may be performed more quickly and in a variety of modes or manners based on an interaction of the reportable or mobile air purifier and the cradle, improving satisfaction.

The cradle may be elongated in a left and right or horizontal direction, and the seating groove and the seating plate may be provided on left and right sides of the cradle, respectively. The air purifying system may be operated in response to various individual user's needs for clean air.

At least two air purifiers may each be suited to a particular indoor space. A first air purifier may be suited to an indoor space different than an indoor space to which a second air purifier is suited. The at least two air purifiers may be part of a single air purifying system to supply clean air suitable for a plurality of indoor spaces at the same time. A low-power, windless, quiet, or airless operation mode may be implemented to maintain a clean state of an indoor space without intervention of a user. Each of the two air purifiers may be provided with a handle and formed in a portable size so that the user may conveniently move or reposition the air purifiers. The air purifiers may be conveniently moved to and used in various indoor spaces. Embodiments disclosed herein may prevent overturning of air purifiers and provide air purifiers that are easy to handle.

Embodiments disclosed herein may be implemented as an air purifying system comprising a main air purifier and a first portable air purifier. The main air purifier may have a fan to suction air, a filter to filter foreign matter from suctioned air, and a first docking area provided on top of the main air purifier. The first portable air purifier may have a first fan to suction air and a first filter to filter foreign matter from suctioned air. The first portable air purifier may be configured to be seated on the first docking area. The first docking area may be configured to be lowered with a seating of the first portable air purifier and to be raised with a removal of the first portable air purifier.

A second docking area may be provided on top of the main air purifier. A second portable air purifier may have a second fan to suction air and a second filter to filter foreign matter from suctioned air. The second portable air purifier may be configured to be seated on the second docking area. The second docking area may be configured to be lowered with a seating of the second portable air purifier and to be raised with a removal of the second portable air purifier.

A first wireless charging module may be provided at the first docking area and a second wireless charging module may be provided at a bottom of the first portable air purifier such that the first and second wireless charging modules align when the first portable air purifier is seated on the main air purifier.

The first docking area may include a seating sensor to sense whether the first portable air purifier is seated on the first docking area. The seating sensor may be configured to be lowered with a seating of the first portable air purifier and to be raised with a removal of the first portable air purifier.

The first portable air purifier may include a case, an air guide, a plurality of suction holes, and a handle. The case may surround the first filter and the first fan. The first fan may be provided above the first filter. The air guide may be provided above the first fan. The air guide may be configured to change a direction of discharged air. The plurality of suction holes may be formed in a lower side of the case. The display may be provided on top of the case. The handle may be hinged to an upper side of the case to be rotatable over the display.

A first plate may serve as the first docking area. The top of the main air purifier may include a first recess in which the first plate is raised and lowered.

At least one elastic spring may be provided to support the first plate and configured to lower the first plate into the first recess based on a seating of the first portable air purifier on the first docking area. A plurality of elastic springs may be provided at a periphery of the first plate.

The main air purifier may include a support, a cover, and a guide rod. The elastic spring may be provided above the support. The cover may be provided to surround the elastic spring. The first plate may be provided above the cover. The guide rod may be inserted through a top of the cover, the elastic spring, and the support to secure the elastic member to the support. The guide rod may be fastened to the support so as to be moved up and down when the first plate is moved up and down, respectively.

A seating sensor may be provided at a center of the first plate to sense whether the first portable air purifier is seated. The seating sensor may protrude upward from the first plate and may be lowered with a seating of the first portable air purifier and raised with a removal of the first portable air purifier.

A second recess may be formed in the top of the main air purifier. A second plate may be configured to be raised and lowered within the second recess. A second portable air purifier may be configured to be supported by the second plate. The main air purifier may have a length dimension that is longer than a width dimension and a height dimension. The first recess and second recess may be adjacent in the length dimension.

The main air purifier may include an outer wall, a suction port, a base, and a discharge wall. The outer wall may surround the fan and the filter. The suction port may be formed at a bottom of the outer wall. Air may be suctioned through the suction port. The base may be provided below the outer wall. The discharge wall may be provided at a predetermined position above the suction port. The discharge wall may have a plurality of holes through which filtered air is discharged.

The filter of the main air purifier may include a side surface having a shape that corresponds to an inner contour of the outer wall. A width of the filter may be less than a width of the outer wall so as to form a gap between the filter and the outer wall. The gap may form a channel through which suctioned air travels. The filter may further include a bottom surface that closes a lower opening of the side wall. At least 100,000 holes may be formed in the discharge wall.

Embodiments disclosed herein may be implemented as an air purifier comprising a main air purifier and a secondary air purifier configured to be supported on the main air purifier. The main air purifier may include an outer wall forming an upper opening, an upper surface provided on top of the outer wall to close the upper opening, the upper surface being configured to receive the secondary air purifier, a suction port formed at a bottom of the outer wall through which air is suctioned, a base provided below the outer wall, at least one opening between the outer wall and the base forming the suction port, a first fan provided inside the outer wall to suction air through the suction port, and a filter provided inside the outer wall and below the first fan to filter air suctioned by the first fan.

An upper section of the outer wall may include a discharge wall having a plurality of holes through which filtered air is discharged from the first fan. The discharge wall may be a predetermined distance above the suction port so as to prevent discharged air from being suctioned back through the suction port.

The main air purifier may further include a second fan. The main air purifier may have a length dimension that is longer than a width dimension and a height dimension. The length dimension may be defined by a first side and a second side of the outer wall. The first fan may be provided adjacent to the first side and the second fan may be provided adjacent to the second side.

Embodiments disclosed herein may be implemented as an air purifier comprising a main air purifier provided at a first location and a secondary air purifier configured to be supported on the main air purifier. The secondary air purifier may include a case having a plurality of suction holes, a fan provided inside the case to suction air through the plurality of suction holes, a filter provided below the fan to filter foreign matter from air suctioned through the suction holes, an air guide provided above the fan, the air guide being configured to change a direction of discharged air, a display provided above the air guide, and a handle hinged to an upper side of the case to be rotatable over the display. The secondary air purifier may be configured to be separated from the main air purifier and transported to a second location remote from the first location.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air purifying system, comprising:
 a main air purifier having a fan to suction air, a filter to filter foreign matter from suctioned air, and a first docking area provided on top of the main air purifier; and
 a first portable air purifier having a first fan to suction air and a first filter to filter foreign matter from suctioned air, the first portable air purifier being configured to be seated on the first docking area, wherein the first docking area is configured to be lowered with a seating of the first portable air purifier and to be raised with a removal of the first portable air purifier.

2. The air purifying system of claim 1, further comprising a second docking area provided on top of the main air purifier, and a second portable air purifier having a second fan to suction air and a second filter to filter foreign matter from suctioned air and configured to be seated on the second docking area, wherein the second docking area is configured to be lowered with a seating of the second portable air purifier and to be raised with a removal of the second portable air purifier.

3. The air purifying system of claim 1, wherein a first wireless charging module is provided at the first docking area and a second wireless charging module is provided at a bottom of the first portable air purifier such that the first and second wireless charging modules align when the first portable air purifier is seated on the main air purifier.

4. The air purifying system of claim 1, wherein the first docking area includes a seating sensor to sense whether the first portable air purifier is seated on the first docking area, the seating sensor being configured to be lowered with a seating of the first portable air purifier and to be raised with a removal of the first portable air purifier.

5. The air purifying system of claim 1, wherein the first portable air purifier includes:
 a case surrounding the first filter and the first fan, the first fan being provided above the first filter;
 an air guide provided above the first fan, the air guide being configured to change a direction of discharged air;
 a plurality of suction holes formed in a lower side of the case;
 a display provided on top of the case; and
 a handle hinged to an upper side of the case to be rotatable over the display.

6. The air purifying system of claim 1, wherein a first plate serves as the first docking area, and the top of the main air purifier includes a first recess in which the first plate is raised and lowered.

7. The air purifying system claim 6, further comprising at least one elastic spring provided to support the first plate and configured to lower the first plate into the first recess based on a seating of the first portable air purifier on the first docking area.

8. The air purifying system of claim 7, wherein a plurality of elastic springs are provided at a periphery of the first plate.

9. The air purifying system of claim 7, wherein the main air purifier further includes a support, a cover, and a guide rod, wherein the elastic spring is provided above the support, the cover is provided to surround the elastic spring, and the first plate is provided above the cover, and wherein the guide rod is inserted through a top of the cover, the elastic spring, and the support to secure the elastic member to the support, the guide rod being fastened to the support so as to be moved up and down when the first plate is moved up and down, respectively.

10. The air purifying system of claim 6, wherein a seating sensor is provided at a center of the first plate to sense whether the first portable air purifier is seated, the seating sensor protruding upward from the first plate and being lowered with a seating of the first portable air purifier and raised with a removal of the first portable air purifier.

11. The air purifying system of claim 6, further comprising a second recess formed in the top of the main air purifier, a second plate configured to be raised and lowered within the second recess, and a second portable air purifier configured to be supported by the second plate, wherein the main air purifier has a length dimension that is longer than a width dimension and a height dimension, and the first recess and second recess are adjacent in the length dimension.

12. The air purifying system of claim 1, wherein the main air purifier includes:
 an outer wall surrounding the fan and the filter;
 a suction port formed at a bottom of the outer wall through which air is suctioned;
 a base provided below the outer wall; and
 a discharge wall provided at a predetermined position above the suction port, the discharge wall having a plurality of holes through which filtered air is discharged.

13. The air purifying system of claim 12, wherein the filter of the main air purifier includes a side surface having a shape that corresponds to an inner contour of the outer wall.

14. The air purifying system of claim 13, wherein a width of the filter is less than a width of the outer wall so as to form a gap between the filter and the outer wall, the gap forming a channel through which suctioned air travels.

15. The air purifying system of claim 13, wherein the filter further includes a bottom surface that closes a lower opening of the side wall.

16. The air purifying system of claim 12, wherein at least 100,000 holes are formed in the discharge wall.

* * * * *